United States Patent Office 2,846,192
Patented Aug. 5, 1958

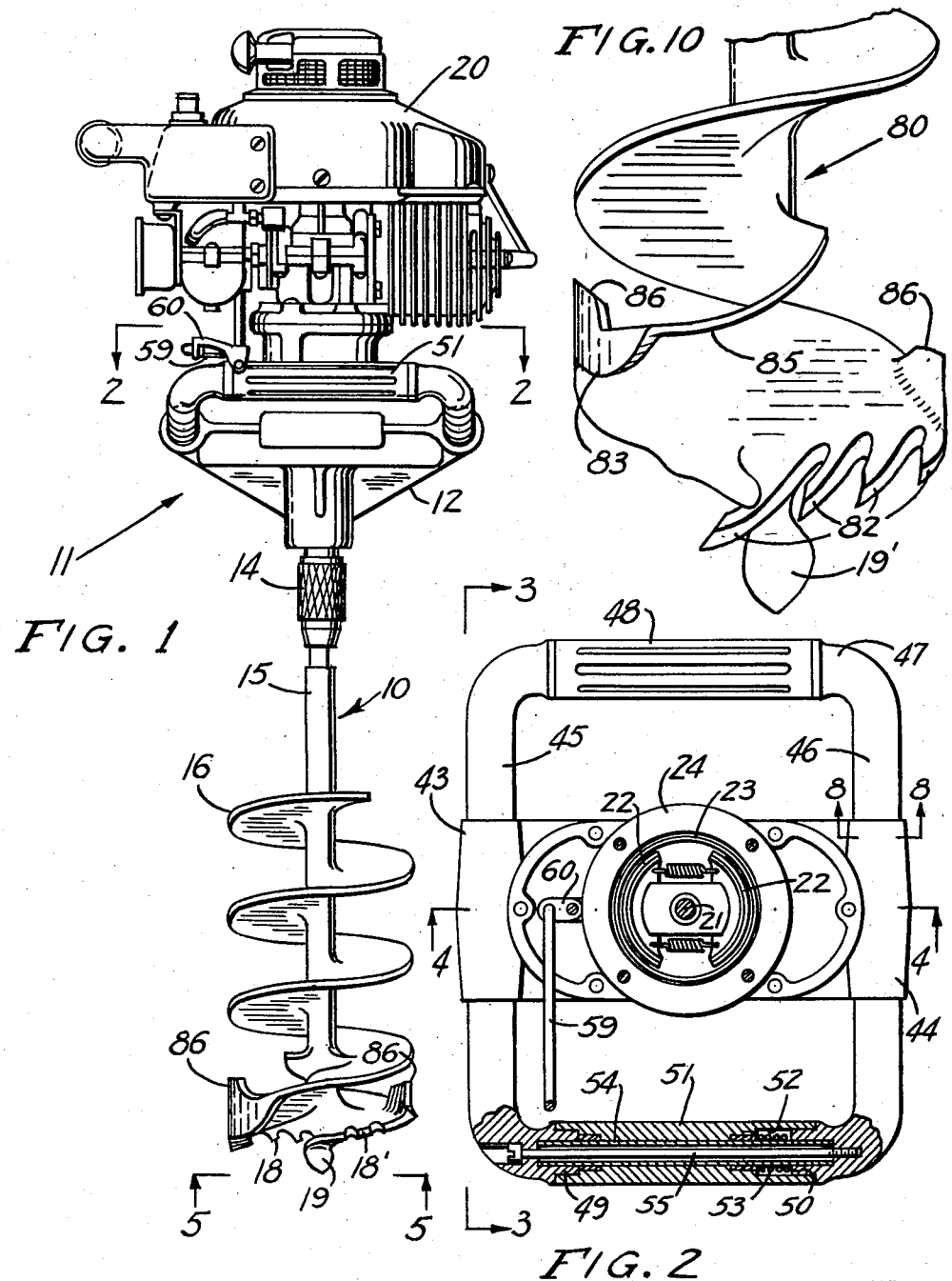

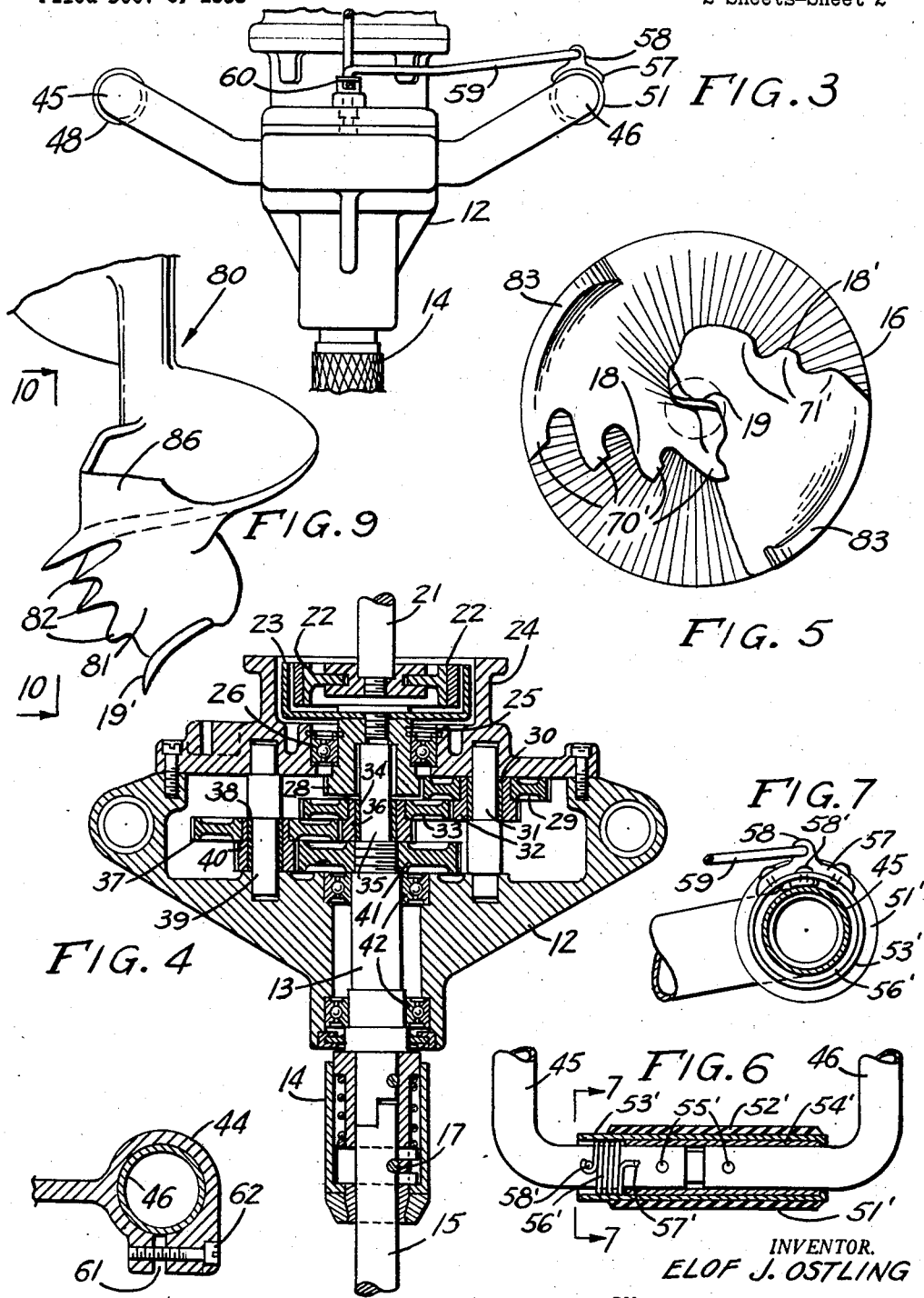

2,846,192

PORTABLE ICE AUGER

Elof J. Ostling, Luck, Wis.

Application December 6, 1955, Serial No. 551,351

3 Claims. (Cl. 255—69)

This invention relates to a portable auger device for forming holes in ice.

A main object of the invention is to provide a bit of the auger type which enables a person to rapidly and efficiently drill a hole in the surface of a sheet of ice, for ice fishing, or for similar purposes.

Another object of the invention is to provide an auger bit which not only lends itself for ready adaptation to cutting a hole in ice, but also to cut a hole in ice with precision and ease.

Further objects and advantages of the invention will become apparent from the following description and claims, and from the accompanying drawings, wherein:

Figure 1 is a side elevational view of an ice auger assembly having the novel auger bit constructed in accordance with the present invention.

Figure 2 is an enlarged horizontal cross sectional view taken on the line 2—2 of Figure 1.

Figure 3 is a fragmentary side elevational view taken on the line 3—3 of Figure 2.

Figure 4 is a vertical cross sectional view taken on the line 4—4 of Figure 2.

Figure 5 is an enlarged bottom view of the auger bit of the present invention employed in the ice auger assembly of Figures 1 to 4, said view being taken on the line 5—5 of Figure 1.

Figure 6 is a longitudinal cross sectional detail view taken through the rotatable handle grip element of a modified form of ice auger assembly.

Figure 7 is an enlarged transverse cross sectional view taken on the line 7—7 of Figure 6.

Figure 8 is an enlarged cross sectional detail view taken on the line 8—8 of Figure 2.

Figure 9 is a fragmentary enlarged elevational detail view of the lower portion of a modified form of auger bit constructed in accordance with the present invention.

Figure 10 is an enlarged elevational view taken on the line 10—10 of Figure 9.

Referring to the drawings, and more particularly to Figures 1 to 5 and 8, the numeral 11 generally designates a portable ice auger assembly which comprises a generally horizontal gear housing 12 in which is centrally journaled a vertical auger shaft 13, said shaft extending below the gear housing 12 and being provided with a conventional chuck 14 which receives the upper end of a shank 15 of a bit 10, the upper end of the shank 15 being adapted to be connected to a driving means. As shown in Figure 4, the shaft 13 and the upper end of the shank 15 are provided with non-circular interfitting end portions which are interengaged in the chuck 14, and the shank 15 is locked in chuck 14 by a transverse locking element 17 which may be at times disengaged when it is desired to detach the auger shank 15 from the chuck 14.

The shank 15 of the bit 10 has an axially extending helical flight 16 between the upper and lower ends. The lower end of the shank 15 has oppositely disposed blade portions 18 and 18' which extend axially from the shank with one of the blade portions or blade portion 18 forming a continuation of the helical flight 16. A pivot tip member 19 depends axially from the lower end of the shank 15 and is adapted to be engaged in the ice to act as a pivot for the bit when the shank 15 is rotated by the main portion of the device, as will be presently explained. Thus, the blades 18, 18' engage the ice and penetrate therethrough responsive to the rotation of the shank 15, forming the desired aperture in the ice.

Mounted on the gear housing 12 is a gasoline engine 20 which has the vertical drive shaft 21 aligned with the shaft 13, as shown in Figure 4, the drive shaft 21 being provided with the normally retracted centrifugal clutch arms 22, 22 which are engageable with the inside surface of a clutch drum 23 responsive to the rotation of the motor shaft 21 above a predetermined speed.

The clutch drum element 23 is rotatably mounted in the cylindrical top portion 24 of gear housing 12, the drum being secured to an axial sleeve element 25 journaled in the upper portion of the gear housing 12, as by a suitable bearing assembly 26. The lower end of the sleeve member 25 is formed with a relatively small gear 28 which meshes with a larger gear 29 secured on a pinion sleeve 30 journaled on a vertical pinion shaft 31 mounted in the gear housing 12. The pinion sleeve 30 is formed at its lower portion with the pinion gear 32 which meshes with a larger gear 33 secured on a pinion sleeve 34 journaled on the reduced top portion 35 of the shaft 13. The pinion sleeve 34 is formed at its lower portion with the pinion gear 36 which meshes with a relatively large gear 37 secured on a pinion sleeve 38 journaled on a vertical pinion shaft 39 mounted in gear housing 12. The pinion sleeve 38 is formed at its lower portion with the pinion gear 40 which meshes with a relatively large gear 41 secured to the top portion of shaft 13, thus completing a reduction gear train from the clutch drum element 23 to the shaft 13.

Shaft 13 is journaled in the lower portion of gear housing 12 in any suitable manner, as by the use of spaced ball bearing units 42, as shown in Figure 4.

As will be readily apparent, when shaft 21 rotates above a predetermined speed, the centrifugal clutch arms 22 are forced outwardly into frictional engagement with the clutch drum 23, whereby shaft 21 transmits torque to the shaft 13 through the above described gear train.

The gear housing 12 is formed at its opposite sides with respective sleeve elements 43 and 44 through which extend the respective side arms 45 and 46 of a generally rectangular ring member formed of tubular steel, or similar stock, the bight portion 47 at one side of the gear housing having rigidly mounted thereon a handle grip element 48. The opposite side of the ring element comprises the opposing reduced annular stud elements 49 and 50 on which is rotatably mounted a handle element 51, the handle element being recessed at its opposite ends to receive the respective stud elements 49 and 50, as shown in Figure 2, one of the recesses, shown at 52 being relatively deep and containing a coiled spring 53 having one end thereof secured to the stud element 50 and having the other end thereof secured to the handle element 51, whereby said handle element 51 is biased toward the position shown in Figure 3 by the spring 53. The handle element 51 is further rotatably suppported on a journal sleeve 54 which extends axially through the handle element 51 and which is received in suitable recesses provided therefor in the stud elements 49 and 50. A fastening bolt 55 extends through one end portion of arm 45, through the sleeve element 54, and into the end portion of the arm 46, being threadedly engaged in said end portion of arm 46, as shown in Figure 2, to secure the ends of the arms 45 and 46 in the positions thereof shown in Figure 2, wherein the sleeve element 51 is freely rotatable on the supporting sleeve 54.

As shown in Figure 3, the rotatable handle grip element 51 has secured thereon a bracket member 57 provided with an apertured lug 58 which is connected by a rod 59 to the throttle lever 60 of the engine 20, whereby the engine throttle may be controlled by rotating the handle grip element 51, enabling an operator to control the motor 20 while holding the apparatus in its working position.

The side arms 45 and 46 of the ring member 47 are rigidly clamped in the sleeves 43 and 44, said sleeves 43 and 44 being split, as shown at 61 in Figure 8, and the sleeves being provided with respective clamping screws 62 extending through one segment of the split sleeves and threadedly engaged in the opposite segment thereof, as illustrated in Figure 8.

Figures 6 and 7 illustrate a modification wherein the rotatable handle grip element, shown at 51' comprises a rubber sleeve 52' mounted on a cylindrical sleeve 53' rotatable on an inner sleeve 54' receiving the ends of the arms 45 and 46 and being secured thereto by fastening pins 55'. A coiled spring 56' surrounds the end of the arm 45, one end of the coiled spring being anchored to arm 45 at 57' and the other end of the spring being connected to the sleeve 53', as by a pin 58'.

Secured on the sleeve 53' is a bracket 57 having an apertured lug 58 which is connected to the throttle lever of the engine 20 by a rod 59, as in the previously described form of the invention.

In both of the modifications above described, the handle ring 47 is rigidly secured to the gear housing 12 in the sleeves 43 and 44 to define a first U-shaped handle bracket on one side of the gear housing having a handle grip element 48 rigidly secured thereon and a second U-shaped handle bracket on the other side of the gear housing having a rotatable handle grip element rigidly mounted on its bight portion. Thus, in using the apparatus, the operator supports same by grasping the respective handle grip elements and controls the engine 20 by means of the rotatable handle grip element which is coupled to the engine throttle lever, in the manner above described.

As will be seen from Figure 5, the blade portions 18, 18' are suitably formed to provide the desired ice penetrating action. Thus, the blade portions 18 may comprise the relatively long, generally arcuate, spaced ice penetrating teeth 70' which extend inwardly from the peripheral edge with at least one of the teeth projecting beyond the axis of the shank 15, whereas the blade portion 18' may comprise a scraping means or the relatively short, spaced scraping teeth 71' which have substantially rounded edges, the teeth 71' extending inwardly from the peripheral edge adjacent to and spaced from the axis of the shank 15. The ice penetrating teeth 70' are formed with relatively pointed edges as compared with the teeth 71', whereby an alternate penetrating and scraping action is provided by the rotation of the auger bit 16 as it cuts its way through the ice. A depending heel 83 is on the peripheral edge of the blade portions 18 and 18' and is located above the scraping means and teeth on the blade portions 18 and 18'.

Figures 9 and 10 illustrate in detail a modified form of the bit according to the present invention. The bit, designated generally by the numeral 80, has on the lower end of its shank oppositely disposed blade portions 81 and 85 which extend axially from the shank 15, the blade portion 81 being provided with penetrating teeth 82 which extend inwardly from the peripheral edge with at least one of the teeth projecting beyond the axis of the shank 15. The blade portion 85 is provided with a scraping edge which extends inwardly from the peripheral edge adjacent to and spaced from the axis of the shank 15. A depending heel 83 is on the peripheral edge of the blade portions 81 and 85 and is located above the level of the scraping edge and teeth on the blade portions 81 and 85. A pivot tip member 19', shown in Figs. 9 and 10, extends axially from the lower end of the shank of the bit 80.

Both the cutting blade member 81 and the scraping blade member 85 are inclined at approximately 20 degrees to the surface of the ice.

By locating the scraping blade 85 and the cutting blade 81 at angles of approximately 20 degrees to the surface of the ice, when the auger nears completion of the hole in the ice, there remains a narrow ring of ice adjacent the outer margin of the hole on which the heel 83 still rides. Since the final ring element supporting the heel 83 is relatively small in width, there is little or no shock or other discomfort to the operator in finishing the hole, as would otherwise be experienced in suddenly breaking through a solid wafer of ice.

Upstanding knife elements 86, 86 are provided on the bit, located on the peripheral edges of the blade portions 18 and 18' of Figures 1 and 5 and of the blade portions 81 and 85 of Figures 9 and 10. When the bit makes its final cut and breaks through the ice, the vertical knife elements 86, 86 cut off any ragged edge elements remaining around the hole, thereby preventing any difficulty in removing the auger bit from the hole.

While certain specific embodiments of an improved ice auger have been disclosed in the foregoing description, it will be understood that various modifications may occur to those skilled in the art. Therefore, it is intended that no limitations be placed on the invention except as defined by the scope of the appended claims.

What is claimed is:

1. In an ice auger, a bit comprising an elongated shank having an axially extending helical flight between the upper and lower ends thereof, the upper end being adapted to be connected to a driving means, the lower end of said shank having oppositely disposed blade portions extending from a point adjacent the axis of said shank to the periphery of said helical flight with one of said blade portions forming a continuation of said helical flight, one of said blade portions comprising relatively long generally arcuate spaced pointed ice penetrating teeth extending inwardly from the peripheral edge with at least one of the teeth projecting beyond the axis of said shank, the other blade portion having a scraping means extending inwardly from the peripheral edge adjacent to and spaced from the axis of said shank, a depending heel on the peripheral edges of said blade portions and located above the level of the scraping means and teeth on said blade portions, and a pivot tip member depending axially from the lower end of said shank.

2. The ice auger according to claim 1 wherein the scraping means of said other blade portion embodies relatively short spaced scraping teeth having substantially rounded edges.

3. The ice auger according to claim 1 which includes in addition upstanding knife elements on the peripheral edges of said blade portions.

References Cited in the file of this patent

UNITED STATES PATENTS

| 1,174,890 | Naylor | Mar. 7, 1916 |
|---|---|---|
| 1,504,863 | Brown | Aug. 12, 1924 |
| 2,016,667 | Crowell | Oct. 8, 1935 |
| 2,393,010 | Arnold | Jan. 15, 1946 |
| 2,393,282 | Berlin | Jan. 22, 1946 |
| 2,598,565 | Lagent | May 27, 1952 |
| 2,733,047 | Morgan | Jan. 31, 1956 |

FOREIGN PATENTS

| 302,446 | Switzerland | Jan. 3, 1955 |